United States Patent [19]

Sakamoto

[11] Patent Number: 5,809,132

[45] Date of Patent: *Sep. 15, 1998

[54] COMMUNICATION TERMINAL DEVICE

[75] Inventor: Naofumi Sakamoto, Kyoto, Japan

[73] Assignee: Murata Kikai Kabushiki Kaisha, Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 612,449

[22] Filed: Mar. 7, 1996

[30] Foreign Application Priority Data

Mar. 10, 1995 [JP] Japan ................................. 7-051213

[51] Int. Cl.$^6$ ........................................ H04M 1/00
[52] U.S. Cl. ........................ 379/377; 379/373; 379/161; 379/184
[58] Field of Search .................................... 379/100, 377, 379/373, 98, 161, 195, 194, 184, 168, 163, 171

[56] References Cited

U.S. PATENT DOCUMENTS

| 4,551,582 | 11/1985 | Matsuo | 379/163 |
| 4,691,338 | 9/1987 | Makino | 379/58 |
| 5,317,629 | 5/1994 | Watanabe | 379/100 |
| 5,369,689 | 11/1994 | Kawamura | 379/100 |
| 5,392,334 | 2/1995 | O'Mahony | 379/100 |
| 5,414,764 | 5/1995 | Watanabe et al. | 379/377 |
| 5,428,675 | 6/1995 | Terajima | 379/100 |
| 5,544,241 | 8/1996 | Dibner et al. | 379/373 |

*Primary Examiner*—Dwayne D. Bost
*Assistant Examiner*—Keith Ferguson
*Attorney, Agent, or Firm*—Armstrong, Westerman, Hattori, McLeland and Naughton

[57] ABSTRACT

A communication terminal device having a line voltage detection circuit 6 connected in parallel with telephone lines 2 is characterized that when either of a built in telephone set 4 or an auxiliary telephone set 5 is off-hooked and then the hook detection circuit OH1/OH2 of the that telephone set 4/5 becomes on-hooked, the true on-off-hook states of that telephone set 4/5 and the branch telephone set 3 are judged by referring to the hook detection circuit OH1/OH2 and the aforementioned line voltage detection circuit 6 after a predetermined time period T has elapsed.

The communication terminal device such as a facsimile device and the like having the arrangement described above is able to detect the off-hook/on-hook state of a built in/auxiliary telephone set connected to the telephone lines in parallel with a branch telephone set without mistake even if the branch telephone set is off-hooked.

4 Claims, 8 Drawing Sheets

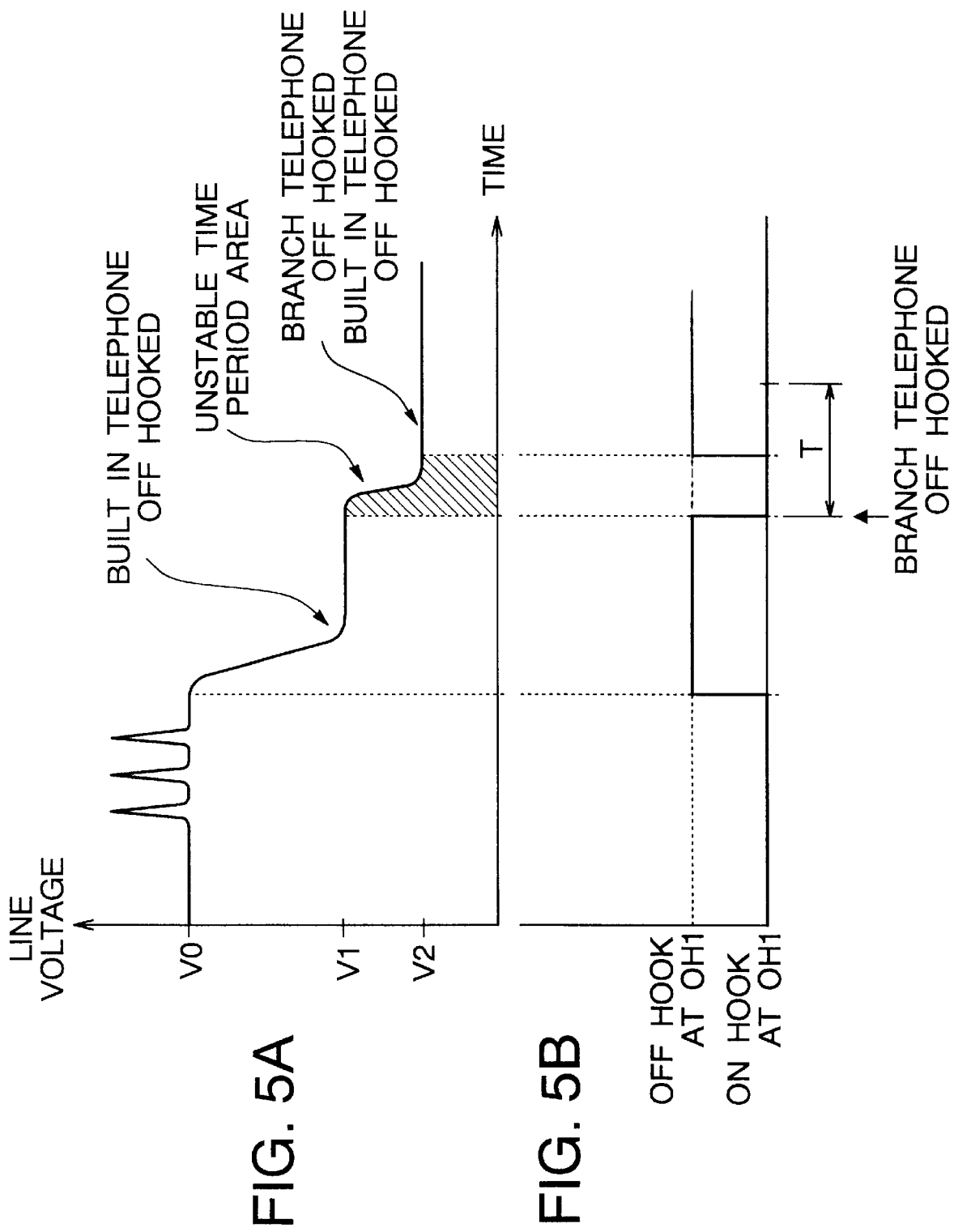

COMMUNICATION TERMINAL DEVICE

BACKGROUND OF THE INVENTION

1. Technical Field

The present invention relates to a communication terminal device such as a facsimile device that can be used with the parallel connection of telephone sets to the telephone line.

2. Background Art

Recently, the parallel connection of a telephone set to a facsimile device and use of the telephone set as a so-called branch telephone set has become widespread.

However, on this kind of facsimile device, as the on-hook/off-hook state of the branch telephone set cannot be detected, various problems are caused when a built in or auxiliary telephone set attached with the facsimile device is used.

For example, when a built in telephone set is in communication with an outside line and then the branch telephone set is off-hooked, the hook detection circuit arranged corresponding to the built in telephone set temporarily inverts to on-hook thus the facsimile device judges that communication by the built in telephone set has finished. Due to this, when an auxiliary telephone set is later off-hooked, regardless of whether the built in telephone set is in communication, the auxiliary telephone set is connected to the telephone lines and inconveniences such as leaking of the conversation on the built in telephone set may occur, disturbing privacy of conversations.

SUMMARY OF THE INVENTION

With regard to these factors, it is an object of the present invention to propose a communication terminal device that can execute various additional controls by the incorporation of a newly arranged line voltage detection circuit that was developed by utilizing the drop in line voltage when the branch telephone set is off-hooked.

The present invention which has been proposed to achieve the above mentioned objects is characterized by the following structure.

The first aspect of the present invention eliminates mistaken operations caused by the temporary inversion (below, known as spot softening phenomena) of the hook detection circuit attached to a built in or auxiliary telephone set from off-hook to on-hook when the branch telephone set is off-hooked. When one of either a built in or auxiliary telephone set connected in parallel to the telephone lines is off-hooked via switch means and then the hook detection circuit of that telephone set becomes on-hooked, the on/off hook states of that telephone set and branch telephone set are judged with referring to the state of the hook detection circuit of the telephone set and the state of the line voltage detection circuit after a predetermined observation period has elapsed.

The second aspect of the present invention has an arrangement in which, when the line voltage detection circuit connected in parallel to the telephone lines is detecting a standby line voltage and then one of either of the built in or auxiliary telephone sets becomes off-hook for the first time, the switch means is controlled so that the other telephone set being in an on-hook state at that point can be disconnected from the telephone lines and the privacy of conversation can be protected.

The third aspect of the present invention has an arrangement in which, when the line voltage detection circuit connected in parallel to the hook detection circuit and telephone lines is detecting an off-hook of the branch telephone set and then an off-hook state of the built in and/or auxiliary telephone set is detected, the switch means is controlled such that the off-hooked telephone set is connected to the telephone lines and two or three people can converse through the branch telephone set.

According to the first aspect of the communication terminal device, when the branch telephone set is off-hooked, the inconvenience of spot softening phenomena caused by the characteristics of the hook detection circuit provided in another telephone set may be eliminated, allowing the capability of detecting the state of the branch telephone set, built in telephone set and auxiliary telephone set without errors.

In short, when either of the built in or auxiliary telephone sets is off-hooked and mid-communication, if the branch telephone set is off-hooked, the loop current which was flowing from the telephone lines to the hook detection circuit of the communicating telephone set is temporarily inverted into an on-hook state because its amount is reduced due to flowing into the branch telephone set located upstream of the telephone lines. This on-hook state continues for a fixed amount of time and then the loop current flows in again, restoring an off-hook state of the built in (or auxiliary) telephone set.

Therefore, on a communication terminal device of the present invention, by executing observation of state of the hook detection circuit of the off-hooked communicating telephone set longer than normal, the CPU 1 judges whether restoration of off-hook has occurred within that observation time. When off-hook has been restored, the CPU 1 judges an off-hook state, and when off-hook has not been restored, the CPU 1 judges it to actually be in an on-hook state.

According to the second aspect of the communication terminal device, when the line voltage detection circuit is not detecting a drop in line voltage and then either of the built in or auxiliary telephone sets off-hooks for the first time, the switch point is controlled such that the switch point of the other on-hooked built in or auxiliary telephone set be opened and that on-hooked telephone set be disconnected from the telephone lines. Because of this, even if the on-hooked other telephone set off-hooks later, that telephone set does not connect to the telephone lines and the privacy of conversation can be protected.

According to a third aspect of this communication terminal device, when an off-hook of a branch telephone set is detected by the hook detection circuit and line voltage detection circuit and then the built in and/or auxiliary telephone set is off-hooked, the switch point is restored to a standby state and connected to the telephone lines. Therefore if the built in or auxiliary telephone set off-hooks then, two or three people can converse between the already off-hooked branch telephone set and this (these) telephone set(s).

BRIEF DESCRIPTION OF THE DRAWINGS

FIG. 5(a) is a flowchart showing the change in line voltage in accordance with on/off hook state of a built in or auxiliary telephone set (this one is maintained in an off-hooked state) and other telephone sets when spot softening phenomena is caused.

FIG. 5(b) is a flowchart showing the change in the state of a hook detection circuit of a built in or auxiliary telephone set (this one is maintained in an off-hooked state) in accordance with on/off-hooked state of the telephone set described above and other telephone sets.

DETAILED DESCRIPTION OF THE PREFERRED EMBODIMENTS

Below, with reference to the diagrams, an embodiment of the present invention will be described.

Figure 1:
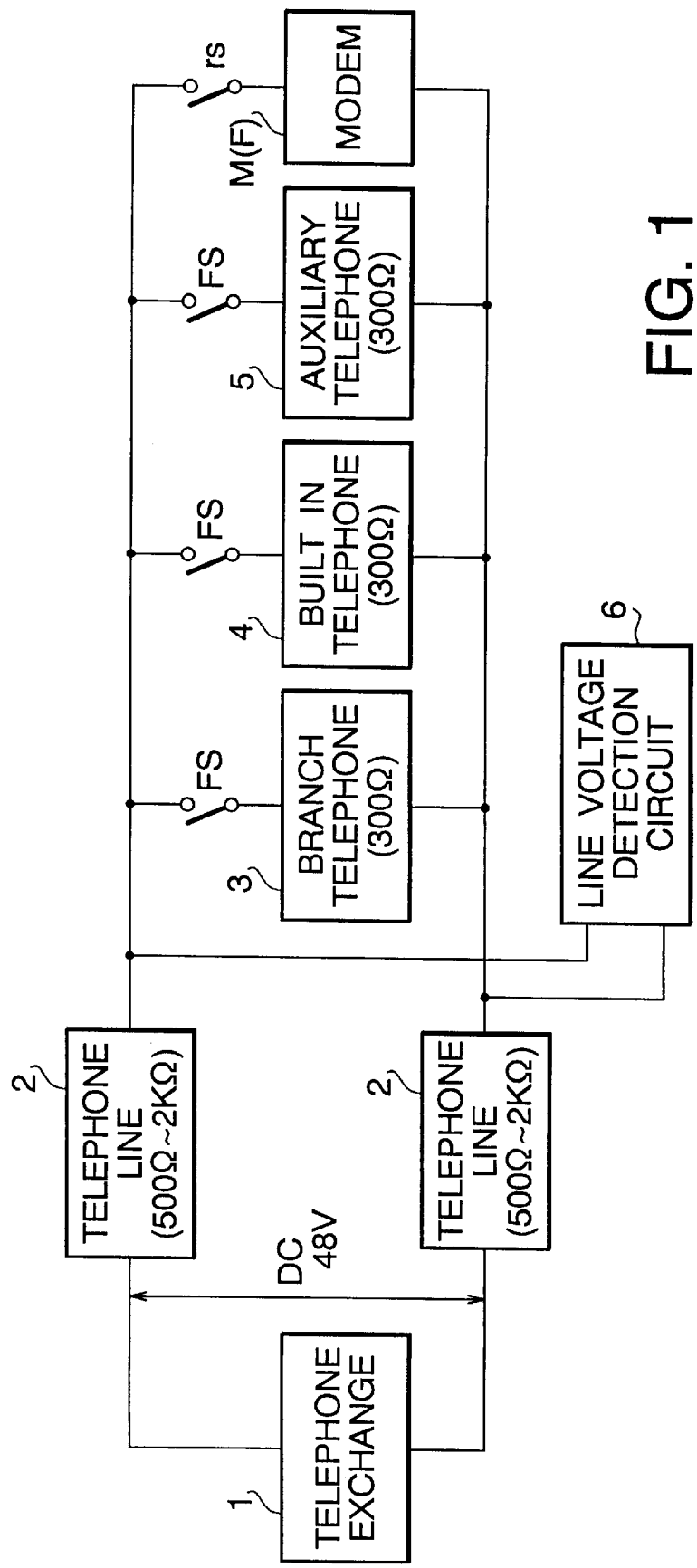
FIG. 1 is an exemplary view of a direct current equivalent circuit shown in a facsimile device.

FIG. 1 is a diagram of direct current equivalent circuit showing the state of connection of telephone lines with a facsimile device.

Each of a branch telephone set 3, built in telephone set 4, auxiliary telephone set 5 and modem M of a facsimile device F possesses an internal resistor as a load and is connected in parallel to the end of telephone lines 2 that is extended from a telephone exchange 1 and having a predetermined specific resistance, via a hook switch FS and a CML relay contacts rs.

Because of this, when the hook switches FS of these telephone sets 3, 4, 5 close and are off-hooked or when the CML relay contacts of the facsimile device F close and the facsimile device F enters a signal reception or hold state, the value of the combined resistance caused in the end of the telephone lines 2 becomes the value that results from the parallel connection of the inner resistances of the off-hooked telephone set and the facsimile device F which is in hold or signal reception state. Thus, if the number of telephone sets connected in parallel to the telephone lines 2 increases, that combined resistance value is reduced.

In the present invention, the sharing voltage of the combined resistance produced in the end of the telephone lines 2 when the hook switch FS is closed or the CML relay contacts rs close is detected by the line voltage detection circuit 6.

For example, in normal telephone lines, DC 48 V of direct power source is supplied from the telephone exchange 1. The telephone lines 2 have specific resistance of 500-2K Ω per line and each of the branch telephone set 3, built in telephone set 4 and auxiliary telephone set 5 have an internal resistance of 300 Ω. In addition, the resistance of the telephone lines 2 changes depending on the position of the telephone sets 3–5 but can be regarded as almost constant at the same position.

Under these conditions, when the number of telephone sets (including the facsimile devices in a signal reception state) connected to the telephone lines 2 by off-hooking increases, the combined resistance produced in the terminal reduces. For the present invention to use this principle, a line voltage detection circuit 6 is connected in parallel to the telephone lines 2 and the off-hook state of the telephone lines 3–5 or signal reception/hold state of the facsimile device F is detected by the detection of the line voltage level by a line voltage detection circuit 6.

Figure 2:
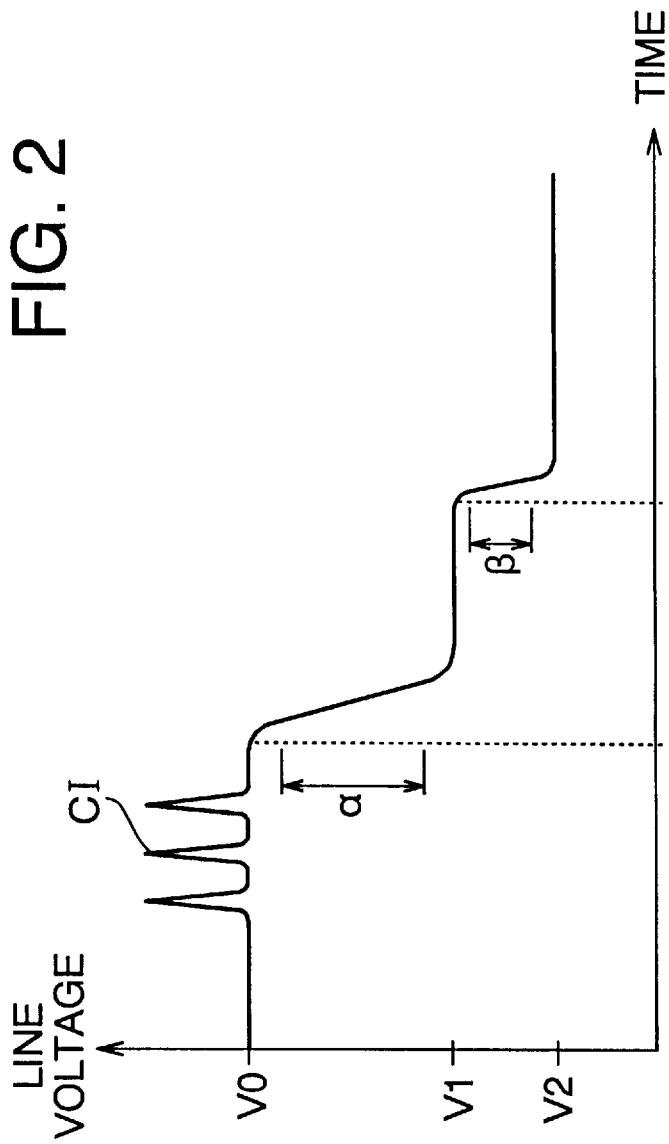
FIG. 2 is an operating time-current characteristic diagram of a line voltage detection circuit.

FIG. 2 shows the basic operations of the line voltage detection circuit 6. When all of the branch telephone set 3, the built in 4 and auxiliary telephone set 5 connected to the telephone lines 2 are in the on-hook state and moreover when the facsimile device F is in a standby state and not in a signal reception or hold state, the $V_0$ level voltage (in short, the voltage corresponding to 48 V) is detected. But if one of the telephone sets is off-hooked or the facsimile device F receives a signal, the level of the detected voltage drops to V1 due to the closing of the direct current circuit. If yet another telephone set is off-hooked, the terminal combined resistance is halved and the level of the detection voltage drops to V2. It can be understood that the drop in the voltage level is largest at the first off hooking and the second drop at the second off-hooking of second set is smaller than the first one, the third drop at the third off-hooking of third set is smaller than the second one . . . and so on. Furthermore, alpha and beta are respectively the first and second standard ranges which will be described later and which are set in order to distinguish the changes in the voltage level. Cl shows the increase in voltage level due to the call signal transmitted from the telephone exchange 1.

The line voltage detection circuit 6 has a standard value which is for distinguishing whether the line voltage has dropped to level V1 or V2. However, as the line voltage readily changes, sampling of the actual value of the line voltage and the calculating the average of those values may be performed so that the level change compared with that average value can be discriminated and thus the on/off hook state of the branch telephone set or another telephone set can be discriminated. When the latter method is utilized, a standard range that discriminates the change of the line voltage level is arranged. For example, the first standard range alpha is arranged in order to discriminate the change of the drop in line voltage from the level $V_0$ at stand-by times to level $V_1$ of when the lines are closed. The second standard range beta is arranged in order to discriminate the change from the level $V_1$ of when the lines are closed to level $V_2$ when a further telephone set is off-hooked. These standard ranges alpha and beta are predetermined according to the experimental data and may be stored in the memory Me which will be described later.

Figure 3:
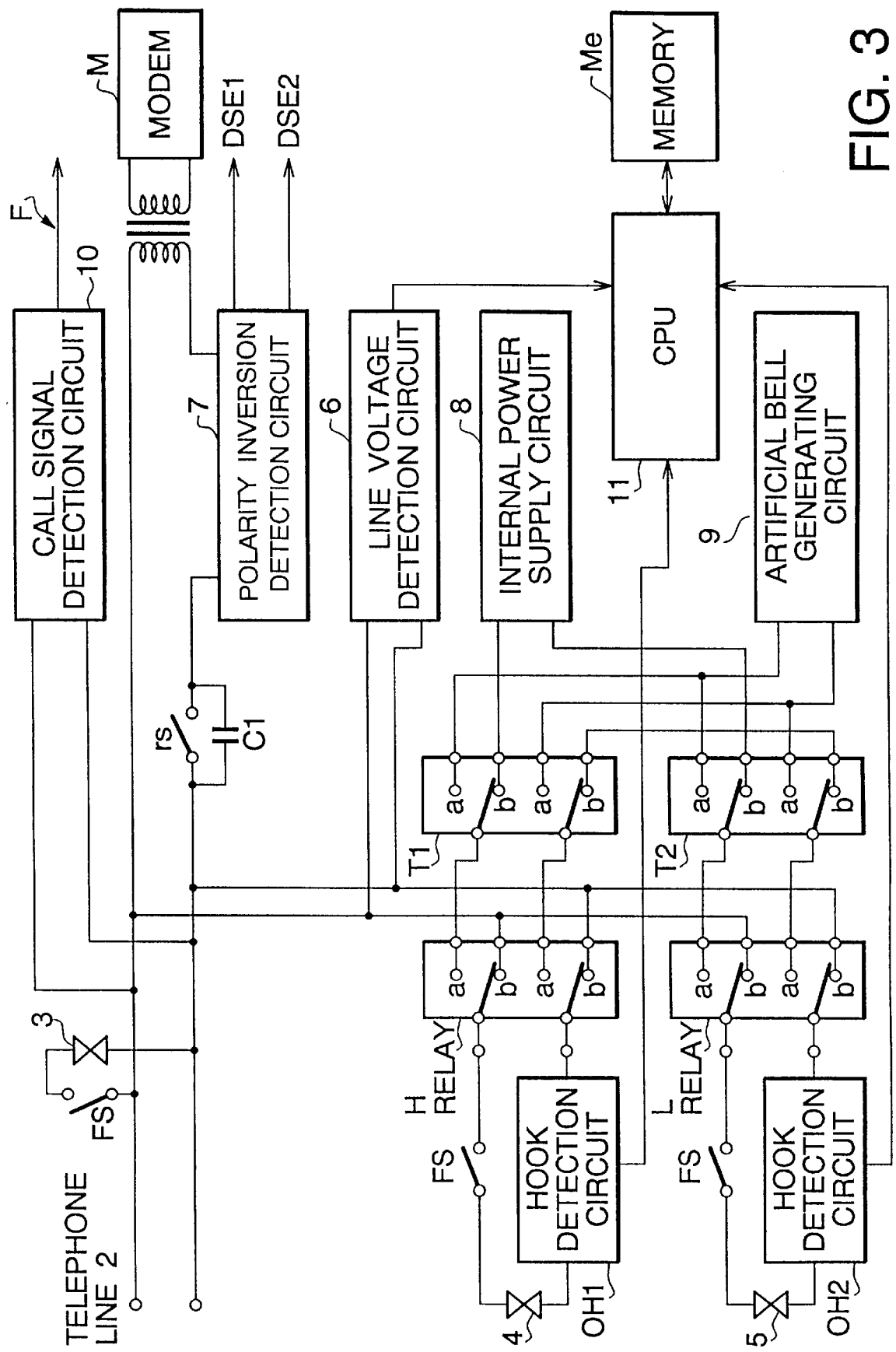
FIG. 3 is a block diagram showing one example of the main structure of a facsimile device according to an embodiment of the present invention.

FIG. 3 is a diagram showing one example of the internal structure of the facsimile device F being one embodiment of the present invention.

This facsimile device F connects a branch telephone set 3 to a pair of telephone lines 2 in parallel and furthermore, inside the main body of the facsimile device F, connects in parallel a built in telephone set 4 and an auxiliary telephone set 5 connected to a telephone terminal to the telephone lines 2 via respectively an H and L relay constituting switch means. It should be noted that although not shown in the diagram, a built in telephone answering machine instead of the auxiliary telephone set 5 may be connected or a built in telephone answering machine may be provided in addition.

A line voltage detection circuit 6 and call-signal detection circuit 10 are connected in parallel to the telephone lines 2 inside the main body of the facsimile device F and a polarity inversion detection circuit 7 is connected to the telephone lines 2 via CML relay contacts rs.

The connection of the built in 4 and auxiliary 5 telephone sets can be switched from the telephone line side to the internal circuit side (v. v.) via the H and L relays that are control switch relays having switch contacts a/b controlled by a CPU 11. On the internal circuit side, the connection of the built in 4 and auxiliary 5 telephone sets can be switched from the internal power supply circuit 8 to the artificial bell generation circuit 9 that outputs a call tone for the built in and auxiliary telephone sets (v. v.), by the internal switch relays T1, T2 having switch contacts a, b. Furthermore, a hook detection circuit OH1, OH2 for detection of on-hook/ off-hook of the handset is connected to each of the built in 4 and auxiliary 5 telephone sets, respectively.

Herein the hook detection circuits OH1, OH2 have photo-couplers. When the facsimile device F is in a standby state and each of the telephone sets 4, 5 are connected to the telephone lines 2 by way of the H, L relays, and if each of the handsets of the telephone sets 4, 5 are removed thus closing the respective hook switches FS, FS (an off-hook state), an off-hook is detected by the loop current flowing from the telephone lines 2 into the photo-coupler. When the handset is replaced opening the hook switch FS, FS (an on-hook state), an on-hook is detected by the termination of the flowing of the loop current. That detection signal is input into the CPU 11 and judgment is carried out there.

Me is the memory for memorizing the line voltage standard discrimination values, the sampled average values when the lines are closed and open, the first and second standard ranges alpha, beta needed for the level discrimination and the like at the line voltage detection circuit 6.

In addition, in response to a call from the telephone line 2, the CPU 11 closes the CML relay contacts rs and connects the modem M to the telephone lines 2 when the call signal detection circuit 10 detects a 16 Hz call signal CI (refer to FIG. 2). After the facsimile device F has received a signal and when it is in a hold state, the CPU maintains those CML relay contacts rs in a closed state.

Also, if set in the answer phone mode, automatic signal reception is possible by an automatic signal reception function in the built in answering machine. It should be noted that C1 is a capacitor and is connected in parallel to the CML relay contacts rs. Even if the CML relay contacts rs are open, C1 connects the modem M to the telephone lines 2 in response to an alternating current.

The built in telephone set 4 and auxiliary telephone set 5 are able to carry out dialogs through the built in and auxiliary telephone sets 4, 5. As a result, when one, for example telephone set 4, is off-hooked and the extension phone number of the counterpart (in this case telephone set 5) is specified by a key operation, the CPU 11 closes the L relay contact a, also closes the internal switch relay T2 contact a, operates the artificial bell generation circuit 9 and calls the counterpart telephone set 5.

In response to this, when the counterpart telephone set 5 that receives the call off-hooks, the CPU 11 maintains the closure of the L relay contact a, closes the contact b of the internal switch relay T2 and makes dialog possible by connecting the internal power supply circuit 8. At this time, the contact a of the H relay closes and the contact b of the internal switch relay T1 is closed.

Figure 4:
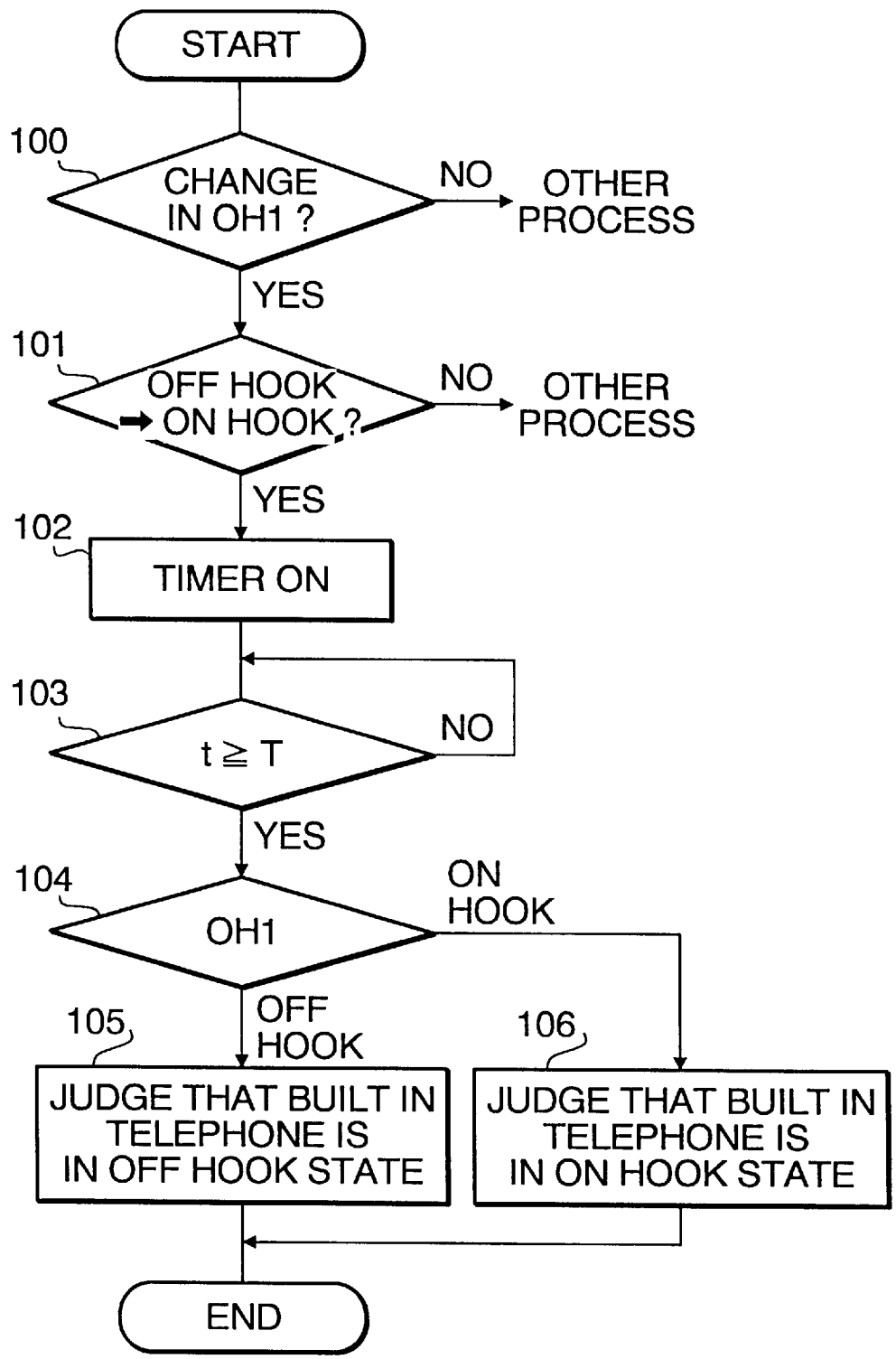
FIG. 4 is a flow chart showing the basic operations of a communication terminal device according to the first aspect of the present invention.

Steps 100–106 of FIG. 4 is a flowchart showing the basic operations of the facsimile device F corresponding to a first aspect of the present invention.

This example shows the operations of when the hook detection circuit OH1 of the built in telephone set 4 is inverted to on-hook when the built in telephone set 4 is off-hooked while the auxiliary telephone set 5 is on-hooked. At this time, the CPU 11 does not judge the built in telephone set 4 to be on-hooked, carries out a timer operation and holds the judgment until a predetermined observation time period T has elapsed.

After the observation time period T has elapsed, the CPU 11 refers to the hook detection circuit OH1 once again and if the hook detection circuit OH1 has returned to an off-hook state, the CPU 11 judges that the hook detection circuit OH1 has temporarily inverted to an on-hook by the spot softening phenomenon of the current due to the off-hook of the branch telephone set 3 and judges that the off-hook of the built in telephone set 4 is continuing. However, if there is no change in the on-hook state, the CPU 11 judges that the handset of the built in telephone set 4 has actually been replaced and thus is on-hooked.

Furthermore, the CPU 11 is able to judge whether the branch telephone set 3 is in an on-hook state or off-hook state by detecting the voltage detection level of the line voltage detection circuit 6 and also referring to the detection state of hook detection circuit OH1, OH2. In short, when the line voltage detection circuit 6 detects the V1 voltage level in spite of both hook detection circuits OH1, OH2 being in the on-hook state, then the branch telephone set is judged to be in an off-hook state.

Figures 6A, 6B:
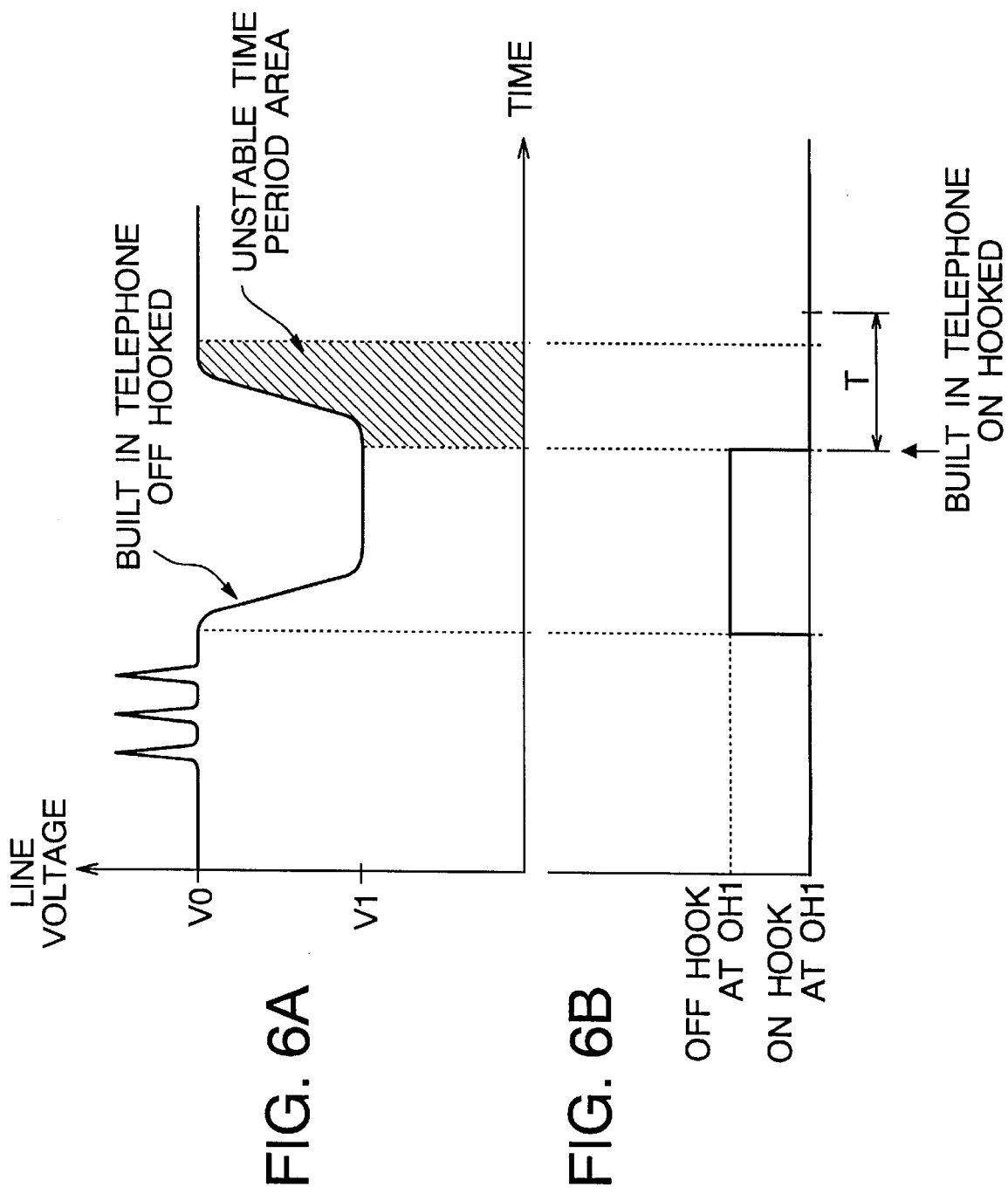
FIG. 6(a) is a flowchart showing the change in line voltage in accordance with on/off hook state of a built in or auxiliary telephone set (this one is on-hooked later) and other telephone sets when spot softening phenomena is caused.
FIG. 6(b) is a flowchart showing the change in the state of a hook detection circuit of a built in or auxiliary telephone set (this one is on-hooked later) in accordance with on/off-hooked state of the telephone set described above and other telephone sets.

FIG. 5(a) and (b) are exemplary diagrams showing the operational relationship between the line voltage detection circuit 6 and the hook detection circuit OH1 in the case where, after the built in telephone set 4 is off-hooked, the branch telephone set 3 is off-hooked and the built in telephone set 4 is maintained in an off-hook state. FIG. 6(a) and (b) are exemplary diagrams showing the operational relationship between the line voltage detection circuit 6 and the hook detection circuit OH1 in the case where, after the built in telephone set 4 is off-hooked, the built in telephone set 4 becomes on-hooked and is thenceforth maintained in an on-hook state. The diagonally lined part shows the unstable time period area.

According to the present invention, there is no mistaken judgment even when the hook detection circuit OH1 temporarily inverts to on-hook due to the spot softening phenomenon caused when the branch telephone set 3 is off-hooked.

Figure 7:
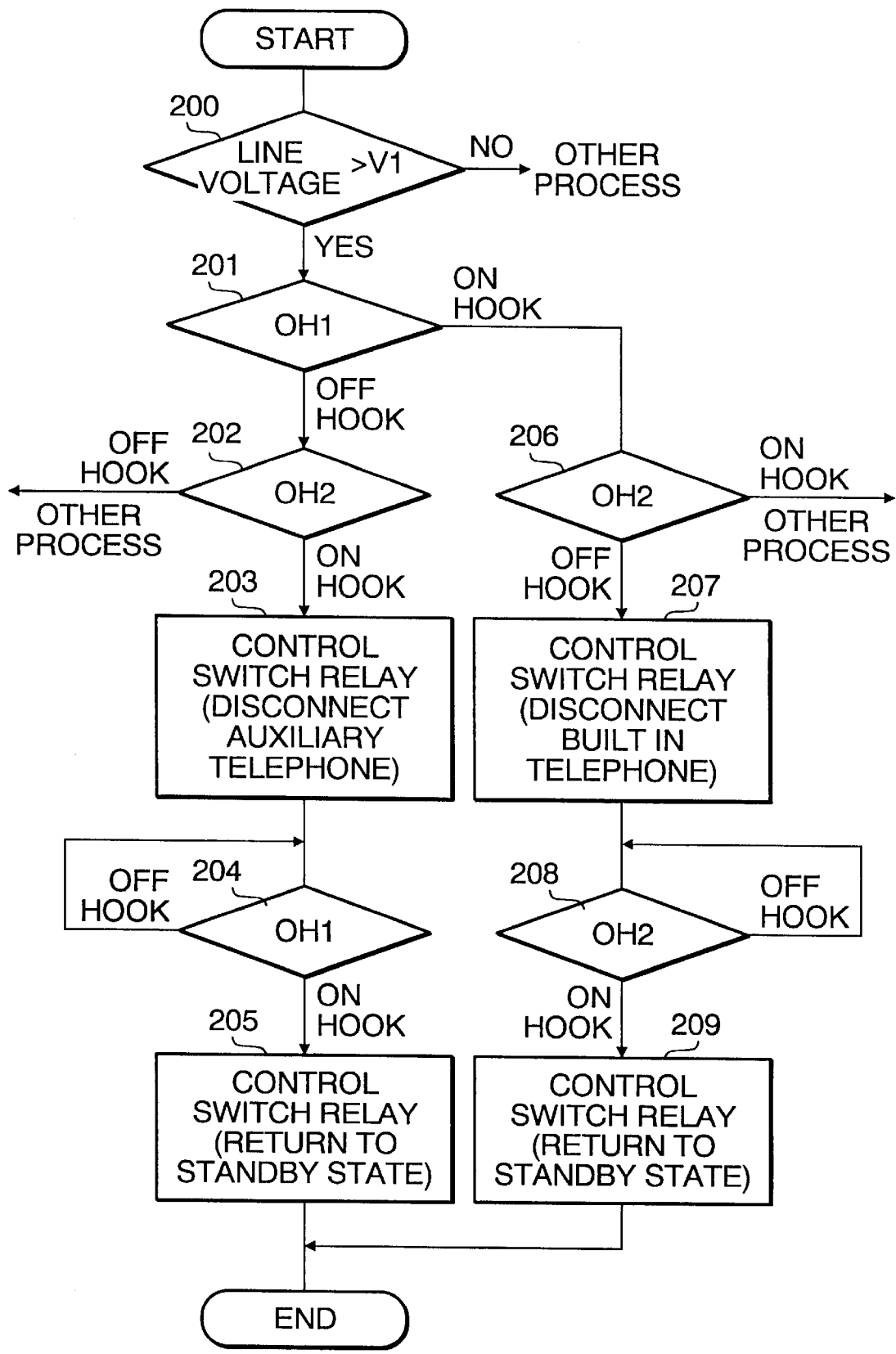
FIG. 7 is a flow chart showing the basic operations of the communication terminal device according to the second aspect of the present invention.

Steps 200–209 of FIG. 7 show a flowchart of the basic operations proposed as a second aspect of the present invention.

In the example described in the chart, when the line voltage level detected by the line voltage detection circuit 6 is at the standby level $V_0$ (that is, the branch telephone set 3 is in the on-hook state) and the facsimile device F is also in a standby state, if the built in telephone set 4 (or the auxiliary telephone set 5) becomes off-hooked dropping the line voltage close to V1 and the dialog starts, the CPU 11 controls the H/L relays being switch means and disconnects the other auxiliary telephone set 5 (or 4) from the telephone lines 2. Then the CPU 11 maintains that state until the telephone set 4 (or 5) in the off-hooked state once again returns to the on-hooked state. When the telephone set 4 (or 5) becomes on-hooked, the CPU 11 restore the initial standby state of the H/L relays.

Figure 8:
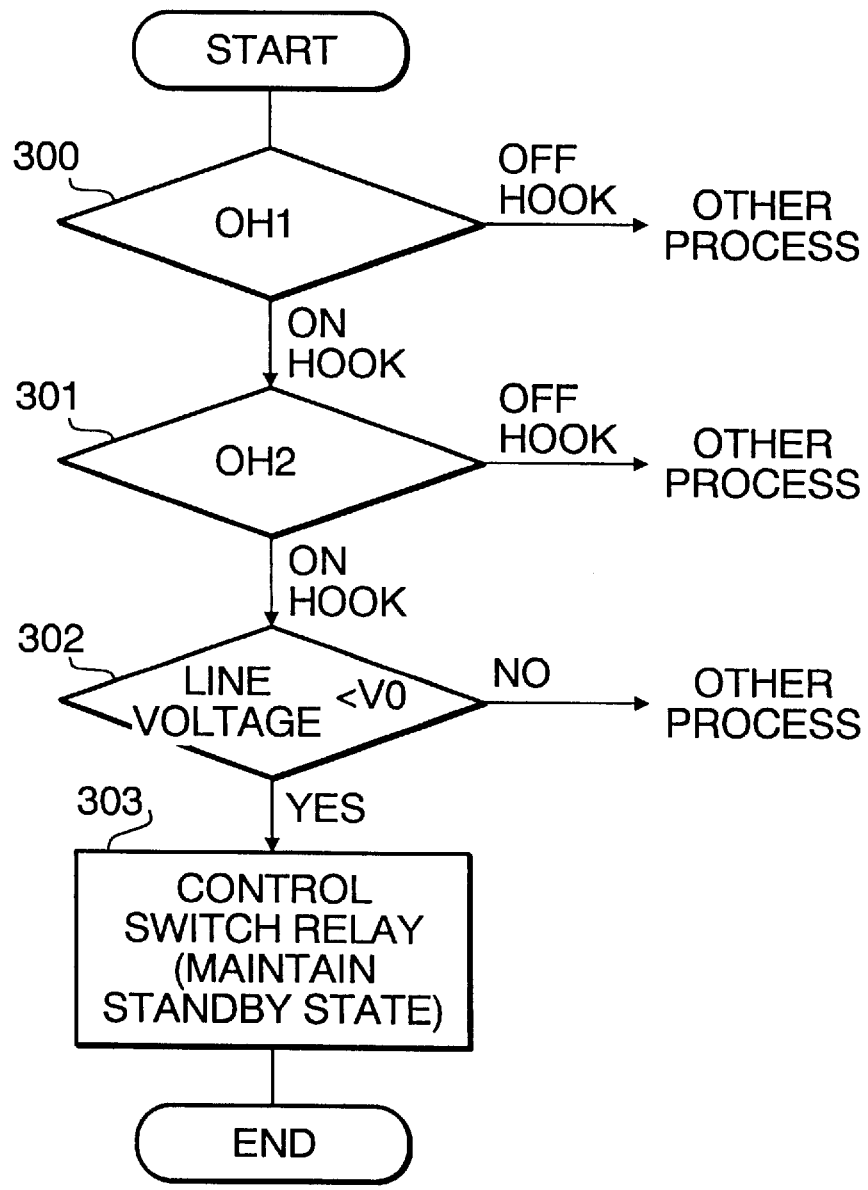
FIG. 8 is a flow chart showing the basic operations of the communication terminal device according to the third aspect of the present invention.

Steps 300–303 of FIG. 8 is a flowchart showing the basic operations proposed by a third aspect of the present invention.

In this invention, when the on-hook state is detected in both of the hook detection circuit OH1 of the built in telephone set 4 and the hook detection circuit OH2 of the auxiliary telephone set 5 and the line voltage detection circuit 6 detects the line voltage drop from $V_0$ to $V_1$, the CPU 11 judges that the branch telephone set 3 has been off-hooked. Under these conditions and when at least one of either built in 4 or auxiliary 5 telephone sets is off-hooked and moreover when the branch telephone set 3 is in a continued off-hook state, the CPU 11 controls the H/L relays being switch means and connects the built in 4 and auxiliary 5 telephone sets to the telephone lines 2 so that dialog between two or three people can become possible.

It should be stated that, in the flowchart of FIG. 8, three person dialog becomes possible among the branch telephone set, an off-hooked built in telephone set 4 and an off-hooked auxiliary telephone set 5 after the branch telephone set 3 is off-hooked.

What is claimed is:

1. A communication terminal device connectable with a built-in telephone set and an auxiliary telephone set, comprising:

a hook detection means for detection an on-hook/off-hook state of each of the built-in telephone set and the auxiliary telephone set; and a line voltage detection means that is connected in parallel to telephone lines, wherein a branch telephone set is connected in parallel with the same telephone lines as said communication terminal device, and wherein when an off-hook state of either the built-in telephone set or the auxiliary telephone set is detected followed by detection of an on-hook state of the same telephone set, the true on-hook/off-hook state of the aforementioned built-in telephone set or the auxiliary telephone set and the branch telephone set is judged by referring to said hook detection means and said line voltage detection means after a predetermined observation time period has elapsed during which an unstable line voltage becomes stabilized in order to avoid false detection of the on-hook/off-hook state.

2. A communication terminal device connectable with a built-in telephone set and an auxiliary telephone set, comprising:

a hook detection means for detection an on-hook/off-hook state of each of the built-in telephone set and the auxiliary telephone set; and a line voltage detection means that is connected in parallel to telephone lines, wherein a branch telephone set is connected in parallel with the same telephone lines as said communication terminal device, and wherein when a standby voltage is detected by said line voltage detection means and then said hook detection means detects that either the built-in telephone set or the auxiliary telephone set is in an off-hook state after a predetermined observation time period has elapsed during which an unstable line voltage becomes stabilized in order to avoid false detection of an on-hook state, the other built-in telephone set or auxiliary telephone set in an on-hook state is disconnected from the telephone line.

3. A communication terminal connection method, including at least a built-in telephone set and an auxiliary telephone set comprising:

a step of detecting an off-hook of either the built-in telephone set or the auxiliary telephone set by a hook detection means; and a step of, if an on-hook state of the aforementioned previously off-hook state built-in telephone set or the auxiliary telephone set is detected, judging a true on-hook/off-hook state of the built-in telephone set or auxiliary telephone set and a branch telephone set by referring to the hook detection means and a line voltage detection means connected in parallel with a telephone line after a predetermined observation time period has elapsed during which an unstable line voltage becomes stabilized in order to avoid false detection of the on-hook/off-hook state.

4. A communication terminal device connectable with a built-in telephone set and an auxiliary telephone set, comprising:

a hook detection means for detecting an on-hook/off-hook state of each of the built-in telephone set and the auxiliary telephone set; and a line voltage detection means that is connected in parallel to telephone lines, wherein a branch telephone set is connected in parallel with the same telephone lines as said communication terminal device, and wherein when said hook detection means and said voltage detection means detect an off-hook state of said branch telephone set and then said hook detection means detects an off-hook state of either of said built-in telephone set or said auxiliary telephone set after a predetermined observation time period has elapsed during which an unstable line voltage becomes unstabilized in order to avoid false detection of an on-hook state, said built-in telephone set or said auxiliary telephone set is connected to the telephone line.

* * * * *